Nov. 29, 1949 — L. A. KEMPTON — 2,489,896
MIXER VALVE AND CONTROL
Filed July 17, 1944 — 2 Sheets-Sheet 1
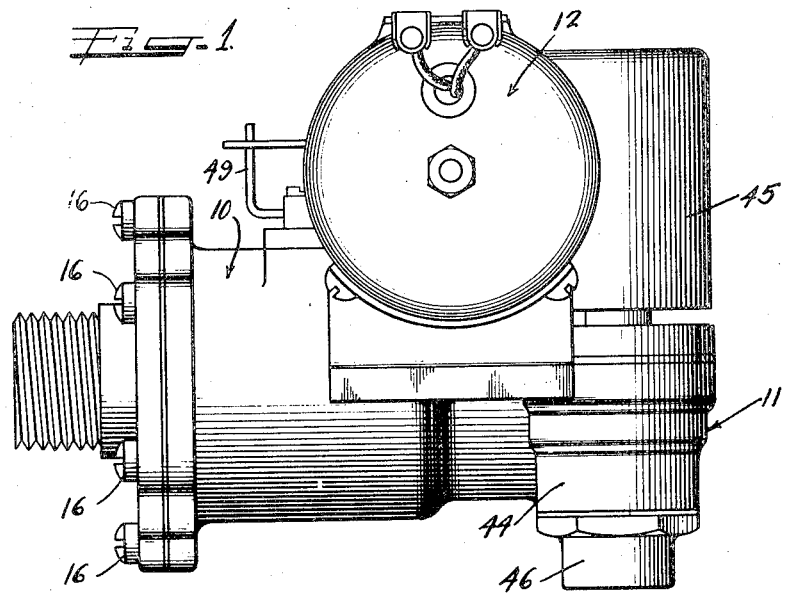
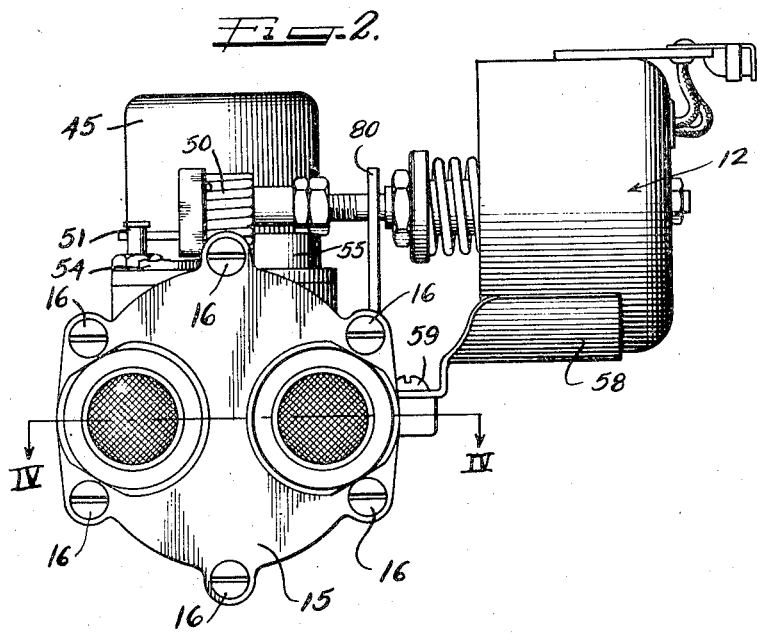
Inventor
LESLIE A. KEMPTON.

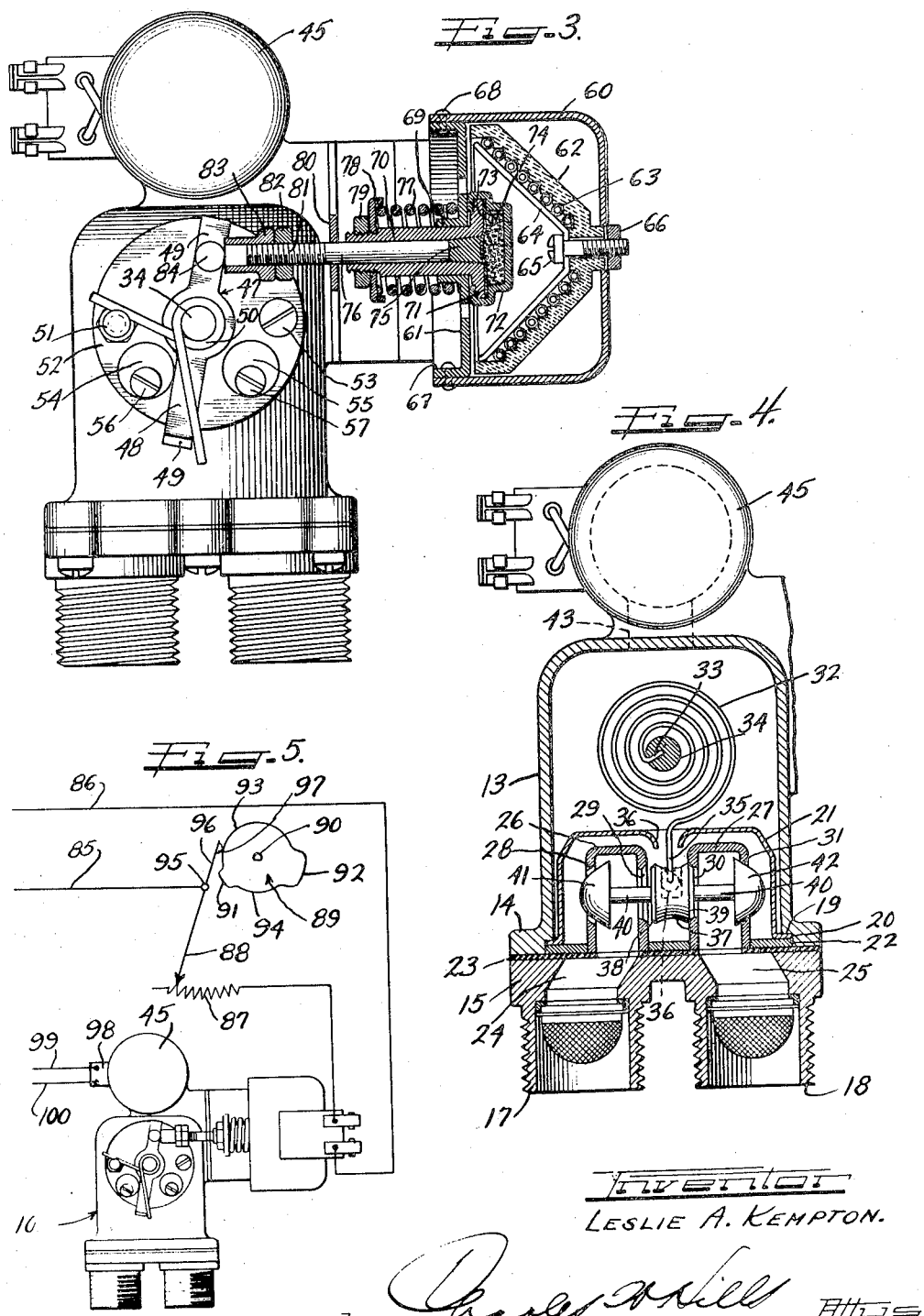

Patented Nov. 29, 1949

2,489,896

UNITED STATES PATENT OFFICE 2,489,896

MIXER VALVE AND CONTROL

Leslie A. Kempton, Chicago, Ill., assignor to The Dole Valve Company, Chicago, Ill., a corporation of Illinois Application July 17, 1944, Serial No. 545,313

6 Claims. (Cl. 236—12)

1

This invention relates to a mixer valve and control and more particularly to an automatic temperature controlled mixer valve in which means is provided for remotely adjusting the temperature setting of the mixer valve.

In fluid supply systems which employ an automatic temperature controlled mixer valve for proportioning fluids of two different temperatures to provide a mixed fluid of a constant temperature, it is frequently desired to change the temperature setting of the mixer valve automatically at predetermined points in a cycle of operation. One of the principal features and objects of the present invention is to provide an automatic temperature controlled mixer valve having remote control means for varying the temperature setting of the mixer valve any desired amount and at any time.

Another object of the present invention is to provide an automatic temperature controlled mixer valve having remote control means for adjusting the temperature level of the mixer valve to a large number of different positions within a relatively wide range of temperature settings.

A further object of the present invention is to provide a novel automatic temperature controlled mixer valve having electrically operated means for controlling the temperature setting of the mixer valve.

A still further object of the present invention is to provide a novel fluid control means including an automatic temperature controlled mixer valve, a shut-off valve and means for changing the temperature setting of the mixer valve.

Another and further object of the present invention is to provide a fluid control device for automatically proportioning fluids of two different temperatures to deliver a mixed fluid of some predetermined temperature value between the temperatures of the relatively hot fluid and the relatively cold fluid, and which mixed temperature level may be varied by a pilot thermostatic element.

Another and still further object of the present invention is to provide a novel automatic temperature controlled mixer valve having a temperature adjusting and setting member thereon and including an auxiliary thermostatic element for changing the temperature setting of the mixer valve, which auxiliary thermostatic element is subject to the action of an electric feeder.

The novel features which I believe to be characteristic of my invention are set forth with particularity in the appended claims. My invention itself, however, both as to its organization, method of operation and manner of construction, together with further objects and advantages thereof, may best be understood by reference to the accompanying drawings, in which:

Figure 1 is a front elevational view of an

2 automatic temperature controlled mixer valve and control embodying the novel teachings of the present invention;

Figure 2 is a left-end view of the automatic temperature controlled mixer valve and control shown in Figure 1;

Figure 3 is a plan view of the mixer valve and control as shown in Figure 2 with a portion of the auxiliary control mechanism shown in section;

Figure 4 is a view of the automatic temperature controlled mixer valve as shown in Figure 3 with the auxiliary control mechanism broken away and with the principal portion of the mixer valve proper shown in a horizontal sectional view as taken along the line IV—IV of Figure 2; and Figure 5 is a diagrammatic illustration of the automatic temperature controlled mixer valve control shown in Figures 1 to 4 as employed in conjunction with cycling means for automatically changing the temperature setting of the mixer valve at predetermined points and for predetermined periods of time in a cycle of operation.

Referring now to the various figures of the drawings, the automatic temperature controlled mixer valve and control shown therein includes an automatic temperature controlled mixer valve 10, a solenoid operated shut-off valve 11 and an auxiliary control unit 12 which is arranged to change the temperature setting of the automatic temperature controlled mixer valve 10.

The automatic temperature controlled mixer valve 10 includes a casting or housing 13 having a flanged end portion 14 to which an end plate 15 is bolted as at 16. The end plate 15 is provided with a pair of externally threaded fluid inlet nipples 17 and 18 which are arranged to be connected to a suitable source of hot and cold fluid, respectively.

The flanged end 14 of the housing 13 is provided with an inner shoulder 19 on which the marginal lip 20 of a mixer chamber shell 21 is seated. A plate member 22 is in turn seated on the lip 20 of the mixer chamber shell 21 and is retained in place by the outer end plate 15 when the latter is bolted in place. Preferably a gasket 23 is disposed between the flanged end 14 of the housing 13 and the end plate 15, and which gasket also extends between the plate 22 and the end plate 15.

The inlet nipples 17 and 18 communicate with ducts 24 and 25 respectively which extend through the end plate 15 and open into hot and cold fluid inlet chamber members 26 and 27 respectively which are mounted on the plate member 22 and extend into the mixer chamber shell 21.

The inlet chambers 26 and 27 are provided with four ports 28, 29, 30 and 31 which are all axially aligned.

Mounted within the housing 13 along the exterior side of the shell 21 is a temperature responsive element 32 which is shown in the form of a spirally wound bimetallic element having its inner end 33 fixed through a shaft 34 and having its outer free end 35 extending through an opening 36 in the mixing chamber shell 21. The free end 35 of the thermostatic element 32 is connected through a ball joint 36 to a valve block 37 disposed between the inlet chamber members 26 and 27 opposite the ports 29 and 30.

The valve block 37 includes frustoconical end portions 38 and 39 which are arranged to be seated respectively on the marginal edges of the openings in the fluid chambers 26 and 27 which define the ports 29 and 30. The valve block 37 carries a valve stem member 40 which projects from opposite ends thereof and which carries at its extremities valve heads 41 and 42 which are arranged to be seated on the marginal edges which define the ports 28 and 31. The valve block 37 and the valve heads 41 and 42 are so dimensioned and positioned that together they form a balanced valve construction for each of the fluid inlet chambers. As shown in Figure 4 of the drawings, the two parts 30 and 31 which open from the fluid inlet chamber 27 into the fluid mixing chamber shell 21 are closed, while the ports 28 and 29 are shown with their respective valve portions 41 and 38 in their fully open positions. As hot fluid begins to flow into the inlet duct 17 through the inlet chamber 26 and out into the fluid mixing chamber 21 and finally into the main portion of the housing 13 which houses the thermostatic element 32, the thermostatic element 32 is heated up and the free end 35 of the thermostatic element 32 will start to move the valve block 37 to the left. Cold fluid will then be permitted to pass from the fluid inlet duct 18 on the fluid inlet chamber 27 into the mixing chamber shell 21. It will be understood that the thermostatic element 32 will proportion the amount of hot fluid with respect to the amount of cold fluid in such a manner that the resulting mixed fluid passing from the mixing chamber 21 into the main housing 13 will be maintained at a constant predetermined temperature depending upon the temperature setting of the thermostatic element 32. When it is desired to raise the temperature level of the mixed fluid, the shaft 34 is angularly moved in a counter-clockwise direction, as viewed in Figure 4. The mixed fluid is delivered from the housing 13 through a mixed fluid outlet duct 43 which opens into the housing member 44 of the shut-off valve 11. The details of the shut-off valve 11 are not shown, for any suitable conventional shut-off valve may be employed. Merely for purposes of illustration the shut-off valve 11 is shown as being a solenoid operated shut-off valve and for this purpose includes a solenoid 45 which opens the valve when energized and causes the valve to be closed when deenergized. The downstream side of the shut-off valve 11 communicates with an outlet duct or nipple 46 which may be connected to any suitable hose or pipe coupling through the container or other place where the fluid is to be delivered.

One of the principal features of novelty of the present invention is the manner in which the shaft 34 is moved to change the temperature setting of the automatic temperature controlled mixer valve 10. As may be seen best in Figure 3 of the drawings, shaft 34 projects through the outer wall of the housing 13 and is provided at its outer end with a member 47 having projecting finger portions 48 and 49. This member 47 is rigidly secured to the shaft 34 so that movement of the member 47 causes movement of the shaft 34. The finger portion 48 has a turned up end 49 (see Figure 1) and this end is engaged by one end of a coiled spring 50 which is wound around the shaft 34. The other end of the spring 50 engages a pin 51 (see Figures 2 and 3) which is carried by the housing 13. As illustrated in the drawings, the housing 13 includes a removable plate 52 which is secured to the main portion of the housing by bolts 53. This removable plate 52 merely provides ready and convenient access to the thermostatic element 32 within the housing 13. Mounted on the plate 52 on opposite sides of the arm 48 are two eccentrically mounted collars 54 and 55 which control the maximum and minimum temperature setting positions of the temperature adjusting member 47. The limiting position may be varied by moving the eccentrically mounted collars 54 and 55 about their respective bolts 56 and 57 which keep them in place.

The auxiliary control unit 12 is mounted on a bracket 58 which is bolted to the housing 13 as at 59. As may be seen best from an inspection of Figure 3 of the drawings, the control unit includes a cup-shaped housing member 60 whose open end is closed by means of an end plate 61. A cone 62 of refractory material has an electric heating element 63 mounted on the inner surface thereof. The electric heating element 63 is held in place by means of a spider 64. The spider 64 and the cone of refractory material 62 are bolted to the housing 60 by a bolt 65 and a nut 66.

The end plate 61 is provided with an outer marginal lip or flange 67 which is riveted to the housing 60 as at 68. The end plate 61 is provided with a central opening defined by a collar 69 through which a sleeve element 70 extends and makes a sliding fit therewith. The inner end of the sleeve element 70 is provided with a radially outwardly extending flange 71 to which a cap 72 is secured. Cap 72 includes a diaphragm 73 which retains within the cap 72 a temperature sensitive material 74 which is arranged to have a change of phase over the operating temperature range. The temperature sensitive material 74 may be any suitable organic crystalline material which is morphologically transformable within the operating range of a thermostat, such, for example, as diphenol, dibromobenzene, dichlorobenzene, or other substances which experience a volumetric change over their fusion range. A force transmitting plug 75 of non-compressible material is inserted within the sleeve 70 against the diaphragm 73 and a piston or actuating lever 76 is inserted into the sleeve 70 against the plug 75. The cap 72 is normally held firmly against the end plate 61 by means of a coil spring 77 which is seated on the end plate 61 around the flange 69. The opposite end of the coil spring 77 is seated against a flanged washer 78 which is retained on the end of the sleeve 70 by means of a nut 79.

The actuating rod 76 passes through a guide arm 80 (see Figures 2 and 3) which is a part of the bracket 58. The left-hand end of the actuating rod 76 is threaded as at 81 and has a lock nut 82 and an adjustable sleeve 83 threaded thereon. The adjustable sleeve 83 bears against a stud or post 84 carried on the arm portion 49 of the temperature adjusting member 47. It will thus be understood that as the temperature sensitive material 74 increases in volume due to a rise in temperature the central portion of the diaphragm 73 is pushed outwardly to move the actuating rod 76 to the left. This causes counter-clockwise rotational movement of the temperature setting member 47. As the temperature sensitive material 74 continues to increase in volume the temperature setting member 47 continues to move in a counter-clockwise direction until the arm portion 48 strikes the upper temperature limiting position cam 55. Thereafter, upon further increase in volume of the temperature sensitive material 74 the cap 72 and the sleeve 70 are moved to the right with respect to the end plate 61 of the housing 60 against the action of the biasing spring 77. It will thus be seen that the biasing spring 77 prevents rupture of the actuating members when the temperature adjusting member 47 strikes the stop member 55.

Upon a decrease in the ambient temperature around the housing 72 containing the temperature sensitive element 74 the temperature sensitive material 74 decreases in volume and the spring 50 causes a clockwise rotational movement of the temperature setting member 47.

From the above description it will be apparent that the relative position of the temperature setting member 47 of the mixer valve 10 may be determined precisely by controlling the ambient temperature around the housing 72 containing the temperature sensitive material 74. In the illustrated embodiment of the present invention this is done by controlling the amount of current flowing through the heating element 63.

For purposes of illustration the heating element 63 is connected to power supply conductors 85 and 86 through a variable resistance element 87. While the amount of resistance introduced in the energization circuit of the electric heating element 63 may be manually controlled if desired, for purposes of illustration it has been shown as controlled by a cam operated movable contact element 88. The relative position of the movable contact 88 is controlled by a timer driven cam 89 carried on a timer shaft 90. The shaft 90 may be driven from any suitable timer motor or cycling means (not shown). The cam 89 may be in the form of a disk or cylinder having raised peripheral surface portions 91 and 92 which are separated by relatively low peripheral surface portions 93 and 94. The movable contact arm 88 is pivotally mounted as at 95 and has a tail portion 96 provided with a cam follower 97 which rides on the peripheral surface portion of the cam 89.

In the position as shown in Figure 5 of the drawings, the maximum amount of resistance is introduced into the energization circuit of the heating element 63 and corresponds to a minimum temperature setting position for the automatic temperature controlled mixer valve 10. More particularly, it corresponds to a position wherein the temperature adjusting member 47 is in a position against the stop member 54. It may now be assumed that as the cam 89 rotates in a clockwise direction, the cam follower 97, upon rotational movement of the cam 89 will ride up on to the raised peripheral surface portion 91 which causes a counter-clockwise rotational movement of the contact arm 88. This reduces the amount of resistance in the energization circuit of the electric heating element 63 and increases the heating effect of the heating element. This, in turn, raises the ambient temperature around the housing 72 containing the temperature sensitive material 74 and causes movement of the actuating rod 76 to move the temperature adjusting member 47 to some predetermined intermediate temperature setting position, depending upon the extent of the volumetric change in the temperature sensitive material 74. This movement of the temperature adjusting member 47 causes the temperature level of the mixed fluid flowing through the mixed fluid outlet duct 43 to be raised to a higher predetermined temperature level. Upon continued rotational movement of the cam 89, the cam follower 97 will fall down onto the low peripheral surface portion 94 and then the maximum amount of resistance will again be introduced into the energization circuit of the heating element 63. This results in returning the temperature adjusting member 47 to its minimum temperature setting position. As the cam 89 continues to rotate the cam follower 97 will ride up onto the raised peripheral surface portion 92 to again cause movement of the movable contact arm 88. Due to the fact that the raised portion 92 is greater than the raised portion 91 (the distance from the center of rotation of the cam shaft 90 being greater) less resistance will be introduced into the energization circuit than was the case when the cam follower rode up onto the raised portion 91 of the cam 89. This, in turn, causes a greater heating effect by the heating element 63 and hence greater angular movement of the temperature adjusting member 47.

As will be readily apparent from a consideration of the above description, any temperature level may be set for the automatic temperature controlled mixer valve 10 between its minimum temperature setting position and its maximum temperature setting position by simply controlling the ambient temperature around the housing 72 containing the temperature sensitive material 74 of the control unit 12.

If only two temperature setting positions are desired in a cycle of operation, the eccentrically mounted stop element 54 and the eccentrically mounted stop element 55 may be adjusted in such a manner that when the temperature adjusting member 47 is in engagement with the stop element 54 one of the two predetermined temperature setting positions is obtained, and when the temperature adjusting member 47 is in engagement with the stop element 55 the other of the predetermined temperature setting positions is obtained.

Under such circumstances the raised portions of the cam 89 will be of sufficient extent so that the raise in temperature of the temperature sensitive element 74 will throw the temperature adjusting member 47 all the way over to its maximum temperature setting position, as represented by the stop member 55. The low portions of the cam will cause a sufficient amount of resistance to be introduced into the heating circuit, or to open the heating circuit, so that the spring 50 will throw the temperature adjusting member all the way over to its minimum position against the stop member 54.

The solenoid 45 of the shut-off valve 11 may be connected through its terminal block 98 to a suitable energization circuit through conductors 99 and 100. This energization circuit forms no part of the present invention but for the purposes of the present description it may be understood that this energization circuit may be either manually controlled or controlled through a suitable cycling or automatic timer means.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A temperature controlled fluid mixing device including a housing having therein a temperature sensitive means for determining the temperature level of the fluid mixture, means for adjusting and setting the temperature level at which the temperature sensitive means is arranged to maintain the fluid mixture, auxiliary temperature responsive means on said device arranged to actuate said second means by pure reciprocatory movement, means including an electric heater for locally heating only said auxiliary temperature responsive means, and timer operated means for cyclically varying the amount of heat delivered by said electric heater to said auxiliary temperature responsive means.

2. An automatic temperature controlled mixer valve including a housing having therein a thermal responsive element for controlling the temperature of the mixed fluid, a temperature adjusting member on said mixer valve, an actuating member for moving said temperature adjusting member, means for limiting the extent of movement of said temperature adjusting member, a second thermal responsive element mounted on said mixer valve housing for moving said actuating member, single heater means mounted on said housing in proximity to said second thermal responsive element for increasing the temperature to which said second thermal responsive element is subjected, a plurality of different temperatures, and variable means for controlling the degree of energization of said heating means.

3. An automatic temperature controlled mixer valve having a temperature adjusting member thereon, an auxiliary thermal responsive element mounted on said mixer valve, means associated with said thermal responsive element for moving said temperature adjusting member in one direction upon expansion of said thermal responsive element, biasing means normally urging said temperature adjusting member in the opposite direction, a housing mounted on said mixer valve and at least partially enclosing said thermal responsive element, an electric heating element mounted within said housing in proximity to said thermal responsive element, a substantially cup-shaped heat resisting shield disposed on the opposite side of said electric heating element from said thermal responsive element, said electric heating element being arranged to be connected to a source of electric current, and means for controlling the current supplied to said electric heating element.

4. An automatic temperature controlled mixer valve having a temperature adjusting member pivotally mounted on said mixer valve at an intermediate point on said member, thereby defining two leg portions, a pair of disks eccentrically mounted on opposite sides of one leg portion of said temperature adjusting member thereby providing a pair of stop members, a spring bearing against said one leg portion and urging the same against one of said stop members, a thermal responsive element mounted on said mixer valve and including an actuating rod extending into engagement with the second of said leg portions, means for locally heating said thermal responsive element, and means for controlling the heating effect of said local heating means.

5. An automatic temperature controlled mixer valve having a temperature adjusting member thereon, an actuating member for moving said temperature adjusting member, a pair of stop members for defining limiting positions of movement of said temperature adjusting member toward one of said stop members, a thermal responsive element mounted on said mixer valve for moving said actuator to move said temperature adjusting member against the other of said stop members, a conically shaped electric heater mounted in proximity to and in capping relationship with said thermal responsive element for increasing the temperature to which said thermal responsive element is subjected, and to thereby move said temperature adjusting member against said other stop member, and means for energizing said electric heater.

6. An automatic temperature controlled mixer valve having a temperature adjusting member thereon, an actuating member for moving said temperature adjusting member, a pair of stop members for defining limiting positions of movement of said temperature adjusting member, means for urging said temperature adjusting member toward one of said stop members, a thermal responsive element mounted on said mixer valve for moving said actuator to move said temperature adjusting member against the other of said stop members, a conically shaped electric heated mounted in proximity to and substantially surrounding said thermal responsive element for increasing the temperature to which said thermal responsive element is subjected, means for concentrating the heat delivered by said electric heater on said thermal responsive element, and to thereby move said temperature adjusting member against said other stop member, and cycling means for sequentially controlling the energization of said electric heater.

LESLIE A. KEMPTON.

REFERENCES CITED

The following references are of record in the file of this patent:

UNITED STATES PATENTS

| Number | Name | Date |
|---|---|---|
| 1,292,396 | Gold | Jan. 21, 1919 |
| 1,597,773 | Dodge | Aug. 31, 1926 |
| 1,742,091 | Otto | Dec. 31, 1929 |
| 1,787,304 | Becker | Dec. 30, 1930 |
| 1,826,151 | Persons | Oct. 6, 1931 |
| 1,883,735 | Hall | Oct. 18, 1932 |
| 2,122,050 | Stuart | June 28, 1938 |
| 2,181,606 | Parks | Nov. 28, 1939 |
| 2,238,219 | Fineran | Apr. 15, 1941 |
| 2,278,911 | Breckenridge | Apr. 7, 1942 |
| 2,280,667 | Scott | Apr. 21, 1942 |
| 2,287,810 | Lund | June 30, 1942 |
| 2,372,307 | Alexander | Mar. 27, 1945 |
| 2,442,886 | Bowen | June 8, 1948 |

FOREIGN PATENTS

| Number | Country | Date |
|---|---|---|
| 370,533 | Great Britain | Apr. 14, 1932 |
| 516,046 | Great Britain | Dec. 20, 1939 |